United States Patent
Weng

(10) Patent No.: US 11,830,523 B2
(45) Date of Patent: Nov. 28, 2023

(54) AUDIO MIXING DEVICE AND AUDIO MIXING METHOD

(71) Applicant: Realtek Semiconductor Corporation, Hsinchu (TW)

(72) Inventor: Chung-Hui Weng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/406,233

(22) Filed: Aug. 19, 2021

(65) Prior Publication Data

US 2022/0310122 A1 Sep. 29, 2022

(30) Foreign Application Priority Data

Mar. 25, 2021 (TW) .................................. 110110949

(51) Int. Cl.
*G11B 20/10* (2006.01)

(52) U.S. Cl.
CPC .................. *G11B 20/10527* (2013.01); *G11B 2020/10546* (2013.01); *G11B 2020/10685* (2013.01); *G11B 2020/10694* (2013.01)

(58) Field of Classification Search
None
See application file for complete search history.

(56) References Cited

U.S. PATENT DOCUMENTS

| 6,301,366 B1* | 10/2001 | Malcolm, Jr. .......... H04H 60/04 381/119 |
| 2005/0123144 A1* | 6/2005 | Wallace ............... H04R 29/001 381/56 |
| 2018/0246158 A1* | 8/2018 | Taylor ................ H01R 13/6683 |

OTHER PUBLICATIONS

William H. Hayt, Jr. and Jack E. Kemmerly, Engineering Circuit Analysis (5th ed., McGraw-Hill, Inc., 1993). (Year: 1993).*

* cited by examiner

*Primary Examiner* — Walter F Briney, III
(74) *Attorney, Agent, or Firm* — Locke Lord LLP; Tim Tingkang Xia, Esq.

(57) ABSTRACT

An output buffer set is coupled to a first pair of pins and configured to output art audio output signal to the first pair of pins. A direct current (DC) shifting buffer set is coupled between the audio codec circuit and the first pair of pins, and is directly coupled to the output buffer set and the first pair of pins. An audio port is coupled to the first pair of pins. The DC shifting buffer set is configured to receive a first audio input signal from the audio port through the first pair of pins. The audio codec circuit is configured to record the audio output signal back and mix the recorded audio output signal with a second audio input signal, or mix the first audio input signal with a third audio input signal.

15 Claims, 6 Drawing Sheets

AUDIO MIXING DEVICE AND AUDIO MIXING METHOD

RELATED APPLICATIONS

This application claims priority to Taiwanese Application Serial Number 110110949, filed Mar. 25, 2021, which is herein incorporated by reference.

BACKGROUND

Technical Field

The present disclosure relates to audio mixing technology. More particularly, the present disclosure relates to an audio mixing device and an audio mixing method.

Description of Related Art

With developments of audio technology, many electric devices can support audio mixing functions. For example, the electric device can play music and record it back, and then mix the recorded music with user's vocal signal inputted through a microphone.

However, in some related arts, the electric device includes input buffers and output buffers, and the input buffers and the output buffers are coupled to different pair of pins. In addition, it requires to dispose alternating current (AC) coupling capacitors between an audio port (also called audio jack) and the pair of pins coupled to the input buffers to avoid the operation voltage of the input buffers being pulled to other abnormal voltages by other voltages (e.g., a ground voltage).

SUMMARY

Some aspects of the present disclosure are to provide an audio mixing device. The audio mixing device includes an audio codec circuit, an output buffer set, a direct current (DC) shifting buffer set, and an audio port. The output buffer set is coupled to a first pair of pins and configured to output an audio output signal to the first pair of pins. The DC shifting buffer set is coupled between the audio codec circuit and the first pair of pins, and is directly coupled to the output buffer set and the first pair of pins. The audio port is coupled to the first pair of pins. The DC shifting buffer set is configured to receive a first audio input signal from the audio port through the first pair of pins. The audio codec circuit is configured to record the audio output signal back via the DC shifting buffer set and mix the recorded audio output signal with a second audio input signal, or mix the first audio input signal with a third audio input signal.

Some aspects of the present disclosure are to provide an audio mixing method. The audio mixing method includes following operations: outputting, by an output buffer set in an audio mixing device, an audio output signal to a first pair of pins; receiving, by a direct current (DC) shifting buffer set in the audio mixing device, a first audio input signal from an audio port through the first pair of pins, in which the DC shifting buffer set is directly coupled to the output buffer set and the first pair of pins; and recording, by an audio codec circuit in the audio mixing device, the audio output signal back via the DC shifting buffer set and mixing, by the audio codec circuit, the recorded audio output signal with a second audio input signal, or mixing the first audio input signal with a third audio input signal.

As described above, in the present disclosure, the audio mixing device includes the DC shifting buffer set and the DC shifting buffer set can shift its input DC voltage. Thus, it can avoid the operation voltage of the input buffers being pulled to other abnormal voltages by other voltages (e.g., a ground voltage). Accordingly, an AC coupling capacitor can be omitted in the present disclosure. In addition, in the present disclosure, the DC shifting buffer set and the output buffer set can share pins to reduce pin numbers.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
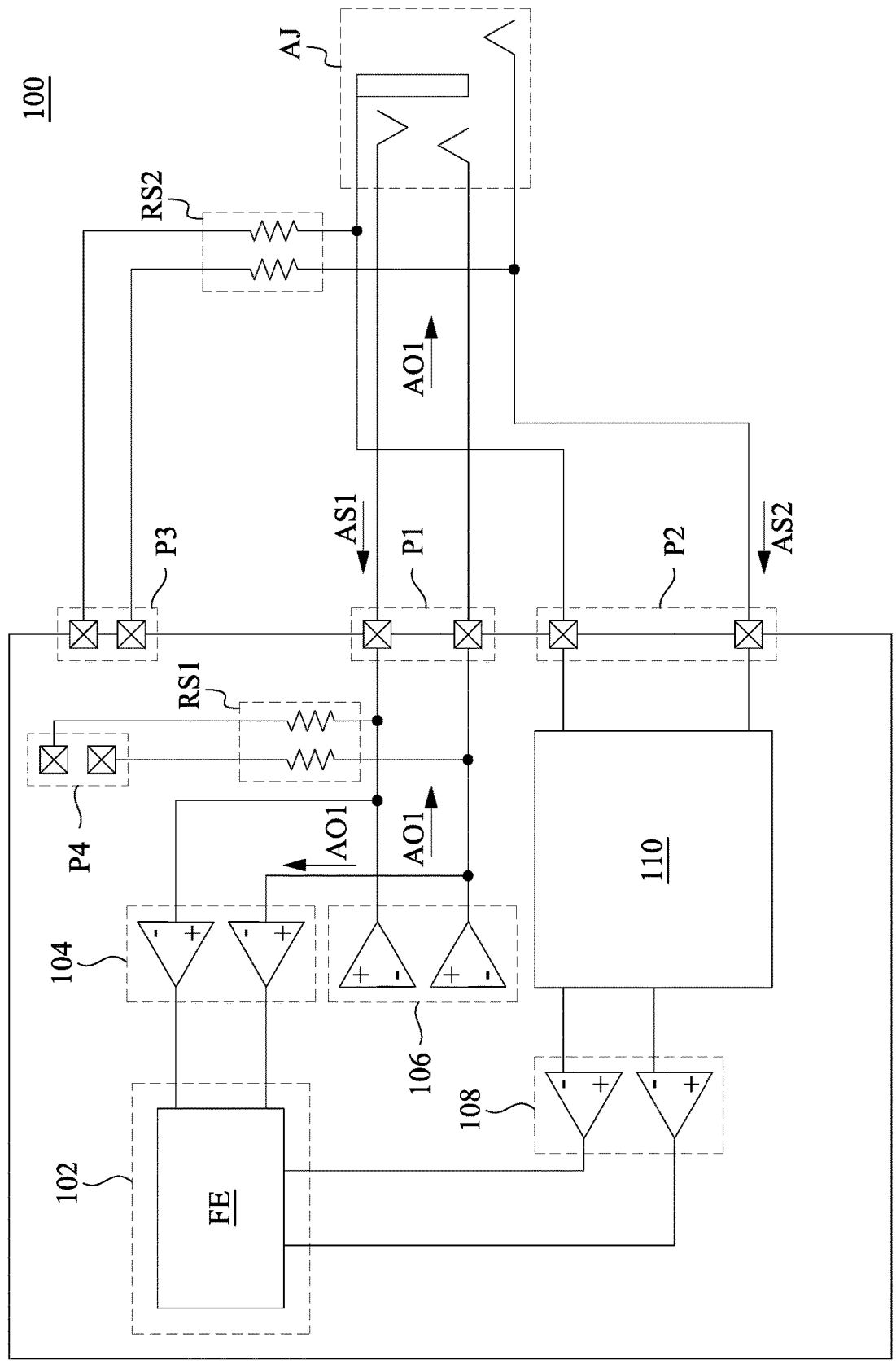
FIG. 1 is a circuit diagram of an audio mixing device according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure. In addition, the drawings are for purposes of illustration only, and are not drawn according to the original sizes. For ease of understanding, the same elements or similar elements in the following descriptions are described with the same reference numerals.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a circuit diagram of an audio mixing device 100 according to some embodiments of the present disclosure. The audio mixing device 100 can work with audio input/output devices to play audio signals and record the audio signals back, and the audio mixing device 100 can mix the recorded audio signals with input audio signals. For example, the audio mixing device 100 can play a piece of music by using an audio output device, the audio mixing device 100 can record the piece of music back by using an audio input device, and the audio mixing device 100 can mix the recorded music with a user's voice inputted through a microphone (a type of audio input device). In some embodiments, the audio mixing device 100 can be disposed in a cellphone, a notebook, or other electric apparatuses supporting recording functions.

As illustrated in FIG. 1, the audio mixing device 100 includes an audio codec circuit 102, a direct current (DC) shifting buffer set 104 (corresponding to a left channel and a right channel), art output buffer set 106 (corresponding to the left channel and the right channel), an input buffer set 108 (corresponding to the left channel and the right channel), a switching circuit 110, an audio port (also called audio jack) AJ, a first pair of pins P1 (corresponding to the left channel and the right channel), a second pair of pins P2 (corresponding to the left channel and the right channel), a third pair of pins P3 (corresponding to the left channel and the right channel), and a fourth pair of pins P4 (corresponding to the left channel and the right channel), a pair of resistors RS1 (corresponding to the left channel and the right channel), and a pair of resistors RS2 (corresponding to the left channel and the right channel). The audio codec circuit 102 includes an analog-to-digital converter (ADC) front-end circuit FE.

In view of coupling, the DC shifting buffer set 104 is coupled between the ADC front-end circuit FE and the first pair of pins P1. Input terminals of the DC shifting buffer set 104 are directly coupled to output terminals of the output buffer set 106 and the first pair of pins P1 (as shown in FIG. 1, the DC shifting buffer set 104 couples the connection between the output buffer set 106 and the first pair of pins P1). Output terminals of the output buffer set 106 are coupled to the first pair of pins P1. The first pair of pins P1 are coupled to the audio port AJ (as shown in FIG. 1, the first pair of pins P1 are coupled to two inner terminals in the audio port AJ). The input buffer set 108 is coupled between the ADC front-end circuit FE and the switching circuit 110. To be more specific, output terminals of the input buffer set 108 are coupled to the ADC front-end circuit FE, and input terminals of the input buffer set 108 are coupled to the switching circuit 110. The switching circuit 110 is coupled to the second pair of pins P2. The second pair of pins P2 are coupled to the audio port AJ (as shown in FIG. 1, the second pair of pins P2 are coupled to two outer terminals in the audio port AJ). The audio port AJ is coupled to the third pair of pins P3 through the pair of resistor RS2 (as shown in FIG. 1, the third pair of pins P3 are coupled to the two outer terminals in the audio port AJ). The fourth pair of pins P4 are coupled to the output terminals of the output buffer set 106 and the first pair of pins P1 through the pair of resistor RS1 (as shown in FIG. 1, the fourth pair of pins P4 couple the connection between the output buffer set 106 and the first pair of pins P1).

In view of operations, the audio mixing device 100 can output an audio output signal AO1 to the audio port AJ such that an audio output device connected to the audio port AJ can output sound corresponding to the audio output signal AO1. The audio output signal AO1 is, for example, a piece of music, but the present disclosure is not limited thereto. For example, the output buffer set 106 can output the audio output signal AO1 to the audio port AJ through the first pair of pins P1. Then, the audio codec circuit 102 can record the audio output signal AO1 back through the DC shifting buffer set 104. To be more specific, the audio output signal AO1 from the output buffer set 106 is transmitted back to the ADC front-end circuit FE in the audio codec circuit 102 through the DC shifting buffer set 104.

In some embodiments, a user can hear music (e.g., corresponding to the audio output signal AO1) outputted from an audio output device (e.g., earphones) connected to the audio port AJ or hear music outputted from other audio output device (e.g., a speaker connected to other audio output path which is not shown in FIG. 1), and the user can sing (e.g., corresponding to the music of the audio output signal AO1) a song (e.g., the audio input device can generate a corresponding audio input signal AS1 or a corresponding audio input signal AS2) toward an audio input device (e.g., a microphone) connected to the audio port AJ.

In some embodiments, the audio input device is, for example, a three-ring microphone. When a driver (it can provide a voltage and is not shown in the figure) provides a bias voltage to two conducting wires disposed in the audio port AJ and corresponding to the first pair of pins P1 through the fourth pair of pins P4 and the pair of resistors RS1, the audio input signal AS1 corresponding to the three-ring microphone can be transmitted from the audio port AJ to the DC shifting buffer set 104 through the first pair of pins P1 and then inputted to the ADC front-end circuit FE.

In some embodiments, the audio input device is, for example, a four-ring headset microphone. When the driver provides a bias voltage to two conducting wires disposed in the audio port AJ and corresponding to the second pair of pins P2 through the third pair of pins P3 and the pair of resistors RS2, the audio input signal AS2 corresponding to the four-ring headset microphone can be transmitted from the audio port AJ to the input buffer set 108 through the second pair of pins P2 and the switching circuit 110 and then inputted to the ADC front-end circuit FE.

In some embodiments, the ADC front-end circuit FE in the audio codec circuit 102 can record (through the DC shifting buffer set 104) the audio output signal AO1 back from the output buffer set 106 and mix the recorded audio output signal AO1 with the audio input signal AS2.

Figure 2:
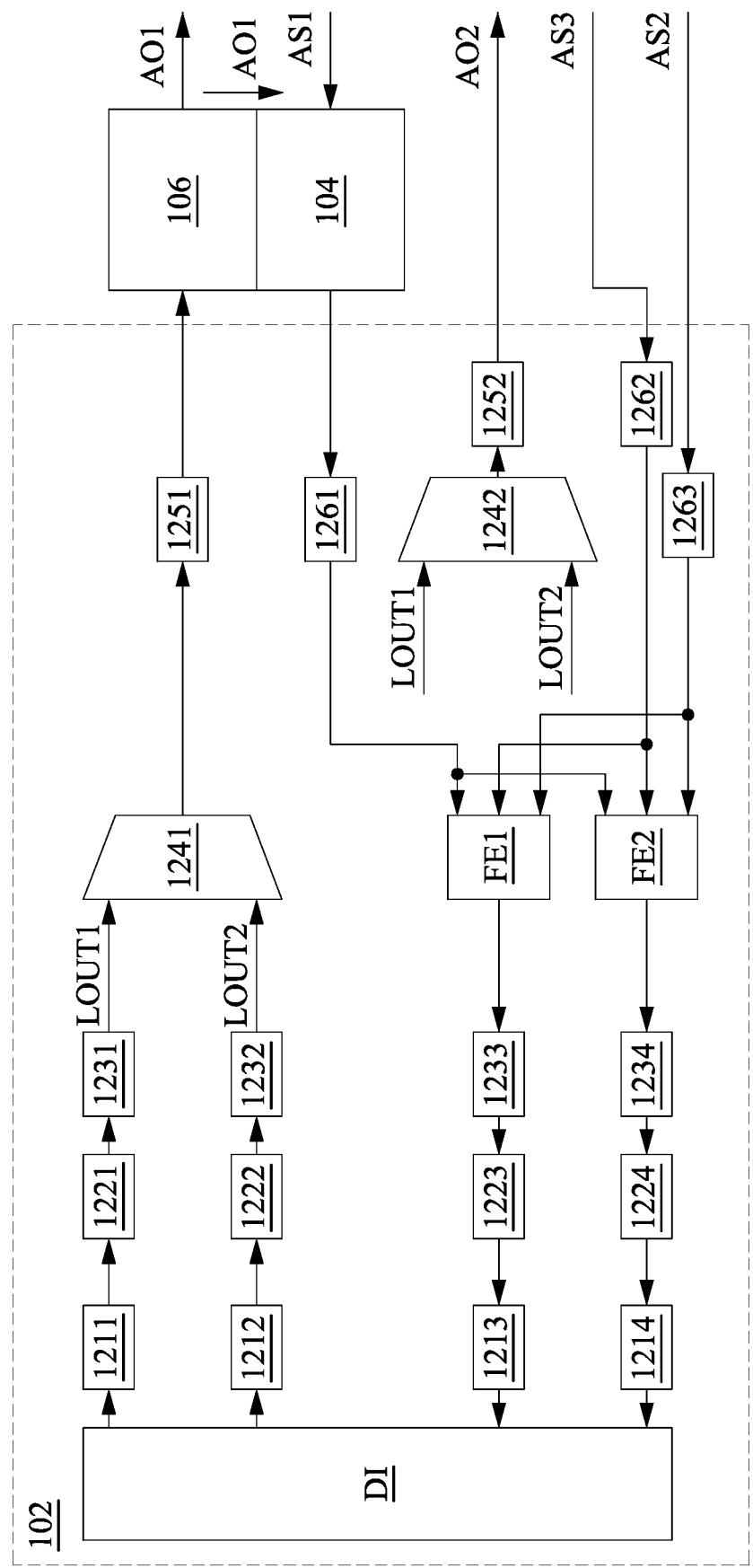
FIG. 2 is a circuit diagram of an audio codec circuit according to some embodiments of the present disclosure.

References are made to FIG. 1 and FIG. 2. FIG. 2 is a circuit diagram of the audio codec circuit 102 according to some embodiments of the present disclosure. As illustrated in FIG. 2, the audio codec circuit 102 includes a digital interface DI, volume control circuits 1211-1214 (i.e., four circuits adjacent to the digital interface DI in FIG. 2), filter circuits 1221-1224 (i.e., four circuits connected to the volume control circuits 1211-1214 in FIG. 2), digital-to-analog (DAC) converter circuits 1231-1232 (i.e., two circuits connected to the filter circuits 1221-1222 in FIG. 2), ADC circuits 1233-1234 (i.e., two circuits connected to the filter circuits 1223-1224 in FIG. 2), multiplexers 1241-1242, mute controllers 1251-1252, volume control circuits 1261-1263, and ADC front-end circuits FE1-FE2.

The volume control circuits 1211-1212, the filter circuits 1221-1222, and the DAC converter circuits 1231-1232 form a playing path. The volume control circuits 1213-1214, the filter circuits 1223-1224, and the ADC circuits 1233-1234 form a recording path.

In some embodiments, the digital interface DI can be a H-DA interface, an I2S interface, a USB interface, or other interface for transmitting audio signals. In some embodiments, each of the volume control circuits 1211-1214 can include a volume controller circuit and a mute controller. In some embodiments, the filter circuits 1221-1222 are over-sampling filters, and the filter circuits 1223-1224 are down-sampling filters.

In view of operations, the digital interface DI is configured to receive digital audio signals. The volume control circuit 1211 (or 1212) is a digital volume control circuit on an audio output path, and it is coupled to the digital interface DI and is configured to adjust the volume of the digital audio signal (in general, the volume adjustment on the digital audio signal is mostly to attenuate volume; a volume range of the attenuated digital audio signal attenuated by the volume control circuit 1211 (or 1212) is, for example, 0 dB to −30 dB when the digital audio signal is 0 dB) and control whether to mute the digital audio signal. The filter circuit 1221 (or 1222) is coupled to the volume control circuit 1211 (or 1212) to filter the digital audio signal which has been adjusted by the volume control circuit 1211 (or 1212). The DAC circuit 1231 (or 1232) is coupled to the filter circuit 1221 (or 1222) to convert the filtered digital audio signal into an analog audio signal LOUT1 (or LOUT2). The multiplexer 1241 is coupled to the DAC circuits 1231 and 1232, and the multiplexer 1241 is controlled by a selection signal (not shown) to output one of the analog audio signals LOUT1 and LOUT2. The mute controller 1251 is coupled to the multiplexer 1241 to control whether to mute the audio signal outputted from the multiplexer 1241. Then, the output buffer set 106 is configured to output the analog audio signal LOUT1 (or LOUT2) from the mute controller 1251 as the audio output signal AO1.

In some embodiments, a mixing circuit (not shown) can be disposed between the multiplexer 1241 and the mute controller 1251 to mix the output of the multiplexer 1241 with other audio signals from other paths.

The volume control circuit 1261 can control the volume of the recorded audio output signal AO1 from the DC shifting buffer set 104 or the audio input signal AS1 from the DC shifting buffer set 104 (e.g., from the three-ring microphone). The volume control circuit 1262 can control the volume of an audio input signal AS3 from other chips or other electric devices (e.g., external chips or external electric devices). The volume control circuit 1263 can control the volume of the audio input signal AS2 (e.g., from the four-ring headset microphone). The volume control circuits 1261-1263 are analog volume control circuits on audio input paths. Since audio input signals from audio input devices are weaker, the volume adjustments on the audio input signals are mostly to enhance volume, volume values of the enhanced audio input signals enhanced by volume control circuits 1261-1263 are, for example, +10 dB/20 dB/30 dB etc. Then, the ADC front-end circuit FE1 (or FE2) can receive the adjusted audio output signal AO1, the adjusted audio input signal AS1, the adjusted audio input signal AS2, or the adjusted audio input signal AS3. The ADC front-end circuit FE1 (or FE2) can mix the audio output signal AO1 with the audio input signal AS2 (i.e., mix the recorded audio with the audio from the four-ring microphone), or mix the audio output signal AO1 with the audio input signal AS3 (i.e., mix the recorded audio with the audio from other chips or electric devices), or mix the audio input signal AS1 with the audio input signal AS3 (i.e., mix the audio from the three-ring microphone with the audio from other chips or electric devices). In some embodiments, the ADC front-end circuit FE1 (or FE2) includes an audio mixing circuit.

The ADC circuit 1233 (or 1234) is coupled to the ADC front-end circuit FE1 (or FE2) to convert the analog mixed audio signal from the ADC front-end circuit FE1 (or FE2) into a digital mixed audio signal. The filter circuit 1223 (or 1224) is coupled to the ADC circuit 1233 (or 1234) to filter the digital mixed audio signal from the ADC circuit 1233 (or 1234). The volume control circuit 1213 (or 1214) is coupled to the filter circuit 1223 (or 1224), the volume control circuit 1213 (or 1214) is a digital volume control circuit on an audio input path to adjust the volume of the filtered digital mixed audio signal (since the audio signal from the front-end circuit varies, the volume adjustment on the filtered mixed audio signal from the ADC circuit 1233 (or 1234) can be to enhance or attenuate, and a volume range of the filtered digital mixed audio signal adjusted by the volume control circuit 1211 (or 1212) is, for example, −30 dB-+30 dB) and to control whether to mute and t transmit the adjusted audio signal to the digital interface DI.

The multiplexer 1242 can receive the analog audio signal LOUT1 and the analog audio signal LOUT2 (identical to the signals inputted into the multiplexer 1241), and the multiplexer 1242 is controlled by a selection signal to output one of the analog audio signal LOUT1 and the analog audio signal LOUT2. In some embodiments, besides the analog audio signals LOUT1 and LOUT2, the multiplexer 1242 further receives an average audio signal of two channels (the left channel and the right channel) of the analog audio signal LOUT2 (or LOUT1), but the present disclosure is not limited thereto. The mute controller 1252 can receive the audio signal from the multiplexer 1242 to control whether to mute, and output the audio output signal AO2 to other chips or other electric devices (e.g., the aforementioned audio output device) according to the audio signal from the multiplexer 1242.

Figure 3:
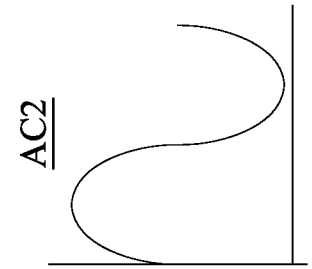
FIG. 3 is a schematic diagram of one DC shifting buffer in a DC shifting buffer set according to some embodiments of the present disclosure.
Figure 3:
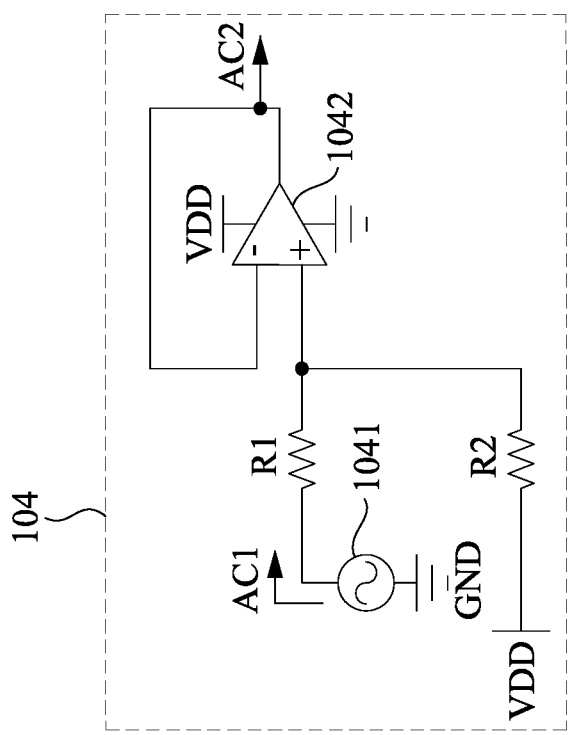
Figure 3:
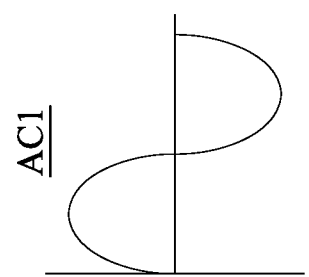

Reference is made to FIG. 3. FIG. 3 is a schematic diagram of one DC shifting buffer in the DC shifting buffer set 104 according to some embodiments of the present disclosure. As illustrated in FIG. 3, the DC shifting buffer can include an alternating current (AC) signal source 1041, a buffer circuit 1042, and resistors R1-R2. The AC signal source 1041 is coupled between a ground terminal GND and the resistor R1. The AC signal source 1041 is configured to output an AC signal AC1. The resistor R1 is coupled between the AC signal source 1041 and a first input terminal (e.g., a positive input terminal) of the buffer circuit 1042. The buffer circuit 1042 is configured to receive a DC voltage VDD (e.g., 5 volts) to operate according to this DC voltage VDD. An output terminal of the buffer circuit 1042 is configured to output an output signal AC2, and the output terminal of the buffer circuit 1042 is also coupled to a second input terminal (e.g., a negative input terminal) of the buffer circuit 1042 to implement a negative feedback structure. The resistor R2 is coupled to the first input terminal (e.g., the positive input terminal) of the buffer circuit 1042 and is configured to receive the DC voltage VDD.

In the configuration of FIG. 3, the resistor R1 and the resistor R2 form a voltage-divider circuit. In some embodiments, a resistance value of the resistor R1 can be identical to that of the resistor R2, but the present disclosure is not limited thereto. In a case of the resistance values of the resistors R1 and R2 being identical, the AC signal AC1 can be shifted to 2.5 volts when the DC voltage VDD is 5 volts.

In some related arts, an input buffer set and an output buffer set are coupled to different pairs of pins, and it is necessary to dispose an AC coupling capacitor between an audio port and the pair of pins coupled to the input buffer set in order to avoid the operation voltage of the input buffers being pulled to abnormal voltages by other voltages (e.g., a ground voltage).

Compared to the related arts above, in the present disclosure, the DC shifting buffer set 104 and the output buffer set 106 can share the pins (e.g., the first pair of pins P1). Accordingly, the numbers of pins and wires on the printed circuit board (PCB) can be reduced, and some wires for transmitting input signals can be omitted. In addition, the DC shifting buffer set 104 can shift its input DC voltage so this can avoid its operation voltage being pulled to abnormal voltages by other voltages (e.g., the ground voltage). Accordingly, it is unnecessary to apply the AC coupling capacitor on the PCB so as to reduce the overall size.

Figure 4:
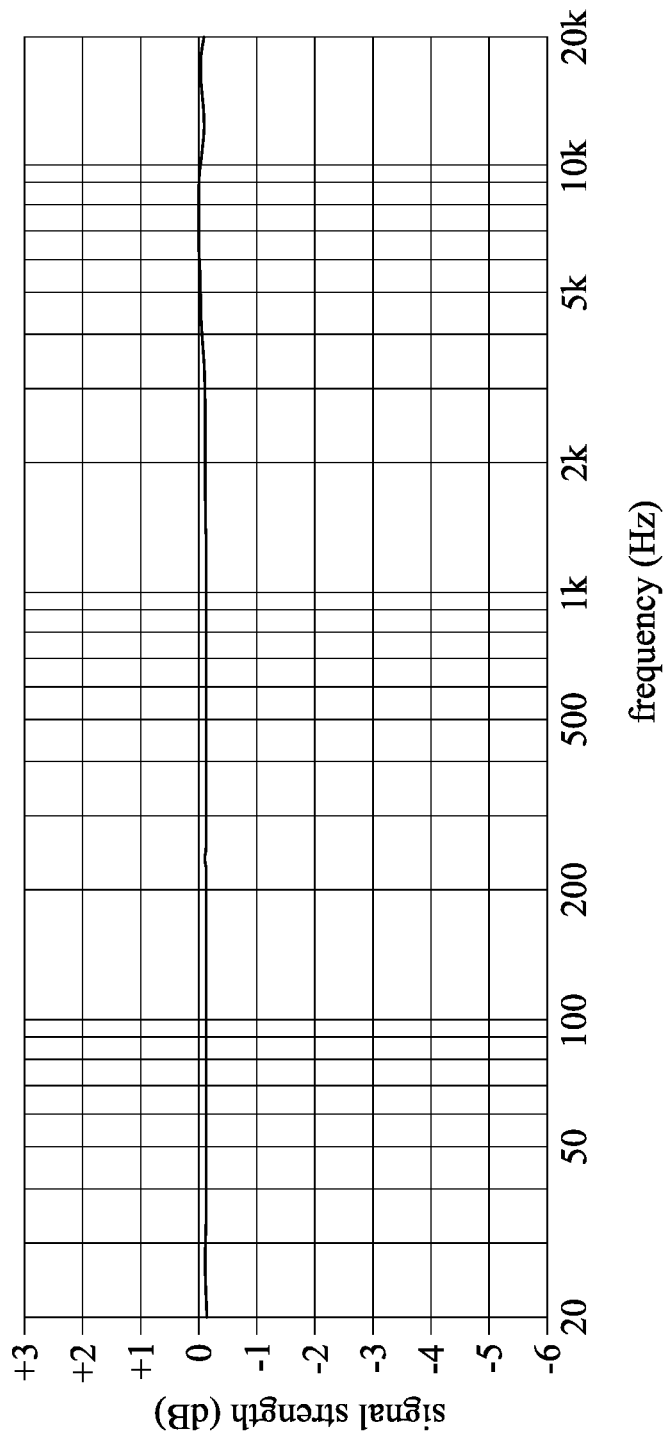
FIG. 4 is a frequency response diagram of a DC shifting buffer according to some embodiments of the present disclosure.

In addition, the present disclosure can enhance a frequency response of the DC shifting buffer set 104. Reference is made to FIG. 4. FIG. 4 is a frequency response diagram of a DC shifting buffer according to some embodiments of the present disclosure. As shown in the embodiments of FIG. 4, there is no obvious attenuation between 20 Hz to 20K Hz.

Figure 5:
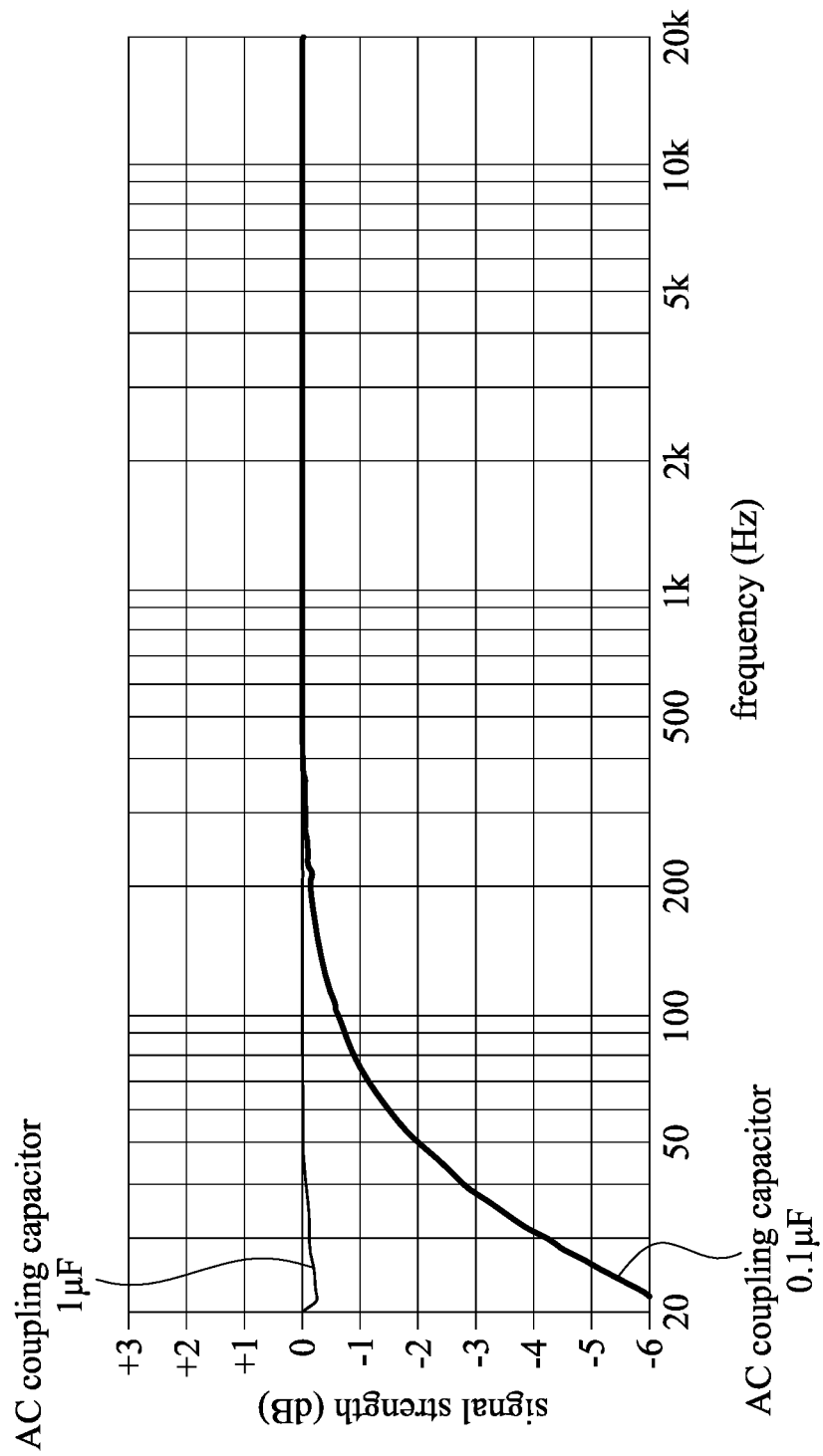
FIG. 5 is a frequency response diagram of a buffer coupled to an alternating current (AC) coupling capacitor in some related arts.

Reference is made to FIG. 5. FIG. 5 is a frequency response diagram of a buffer coupled to an AC coupling capacitor in some related arts. As illustrated in FIG. 5, the frequency response of the buffer coupled to the AC coupling capacitor is attenuated obviously in the low frequency part. Compared to the 1 μF AC coupling capacitor, the frequency response of the buffer which is coupled to a 0.1 μF AC coupling capacitor is attenuated obviously in the low frequency part.

Figure 6:
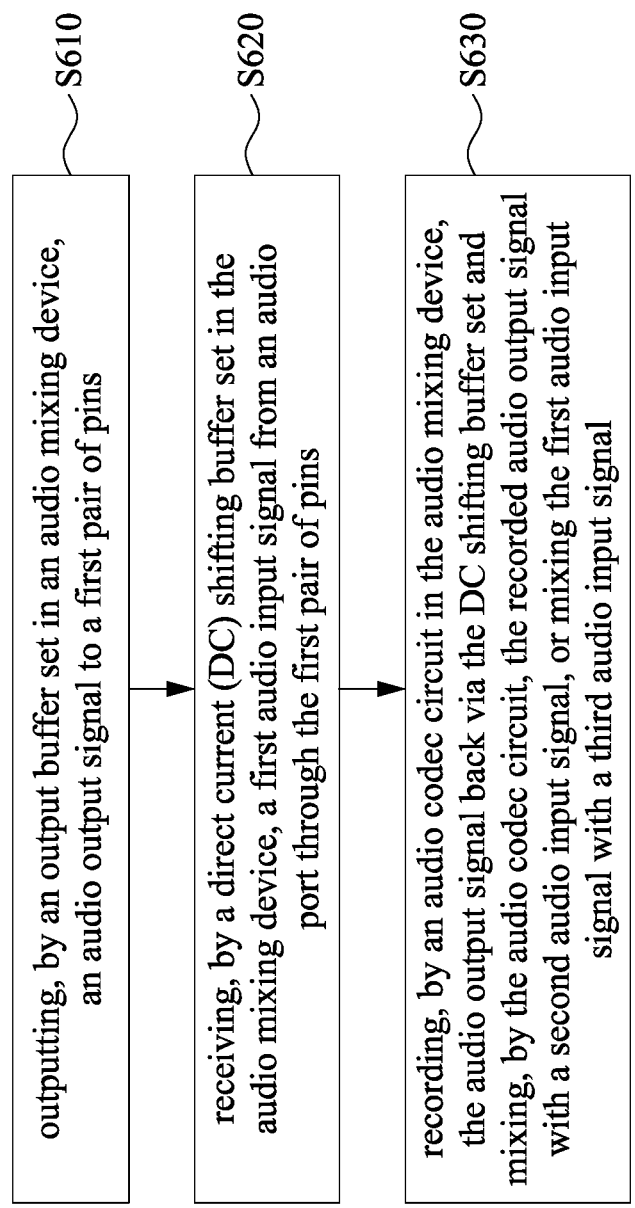
FIG. 6 is a flow diagram of an audio mixing method according to some embodiments of the present disclosure.

Reference is made to FIG. 6. FIG. 6 is a flow diagram of an audio mixing method 600 according to some embodiments of the present disclosure. In some embodiments, the audio mixing method 600 is applied to the audio mixing device 100 in FIG. 1. As illustrated in FIG. 6, the audio mixing method 600 includes operations S610, S620, and S630.

In operation S610, the output buffer set 106 in the audio mixing device 100 outputs the audio output signal AO1 to the first pair of pins P1. The audio output signal AO1 is, for example, a piece of music.

In operation S620, the DC shifting buffer set 104 in the audio mixing device 100 receives the audio input signal AS1 from the audio port AJ through the first pair of pins P1, or the input buffer set 108 receives the audio input signal AS2 from the audio pork AJ through the second pair of pins P2. The audio input signal AS1 and the audio input signal AS2 are, for example, a user's voice.

In operation S630, the audio codec circuit 102 in the audio mixing device 100 records the audio output signal AO1 back, and the ADC front-end circuit FE in the audio codec circuit 102 mixes the recorded audio output signal AO1 with the audio input signal AS2 or mixes the recorded audio input signal AS1 with the audio input signal AS3. For example, the DC shifting buffer set 104 can receive the audio output signal AO1 from the output buffer set 106, and transmit the audio output signal AO1 to the audio codec circuit 102 to record the audio output signal AO1 back. Then, the audio codec circuit 102 mixes the recorded audio output signal AO1 with the audio input signal AS1. Optionally, the DC shifting buffer set 104 can receive the audio input signal AS1 from the audio port AJ, and the audio codec circuit 102 mixes the audio input signal AS1 with the audio input signal AS3 from other chips or electric devices.

The above description of the audio mixing method 600 includes exemplary operations, but the present disclosure is not limited to the order of the operations in this example. Without departing from the spirit and scopes of various embodiments of the present disclosure, operations of the audio mixing method 600 can be appropriately added, replaced, omitted, or executed in a different order.

As described above, in the present disclosure, the audio mixing device includes the DC shifting buffer set and the DC shifting buffer set can shift its input DC voltage. Thus, it can avoid the operation voltage of the input buffers being pulled to other abnormal voltages by other voltages (e.g., a ground voltage). Accordingly, the AC coupling capacitor can be omitted in the present disclosure. In addition, in the present disclosure, the DC shifting buffer set and the output buffer set can share pins to reduce pin numbers.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An audio mixing device, comprising:
   an audio codec circuit;
   an output buffer set coupled to a first pair of pins and configured to output an audio output signal to the first pair of pins;
   a direct current (DC) shifting buffer set coupled between the audio codec circuit and the first pair of pins, and directly coupled to the output buffer set and the first pair of pins; and
   an audio port coupled to the first pair of pins, wherein the DC shifting buffer set is configured to receive a first audio input signal from the audio port through the first pair of pins,
   wherein the audio codec circuit is configured to record the audio output signal back via the DC shifting buffer set and mix the recorded audio output signal with a second audio input signal, or mix the first audio input signal with a third audio input signal,
   wherein a buffer of the DC shifting buffer set comprises:
   an alternating current (AC) signal source;
   a buffer circuit having a first input terminal, a second input terminal and an output terminal, wherein the output terminal is coupled to the first input terminal and the buffer circuit is configured to receive a DC voltage;
   a first resistor coupled between the AC signal source and the second input terminal of the buffer circuit; and
   a second resistor coupled to the second input terminal and configured to receive the DC voltage,
   wherein the output terminal of the buffer circuit is directly coupled to the first input terminal of the buffer circuit.

2. The audio mixing device of claim 1, wherein the third audio input signal is transmitted from an external chip or an external electric device.

3. The audio mixing device of claim 1, wherein a bias voltage is provided to two conducting wires disposed in the audio port and corresponding to the first pair of pins, and the first audio input signal is transmitted from the audio port to the DC shifting buffer set through the first pair of pins and then inputted into the audio codec circuit.

4. The audio mixing device of claim 1, further comprising:
   a second pair of pins coupled to the audio port;
   a switching circuit coupled to the second pair of pins; and
   an input buffer set coupled between the switching circuit and the audio codec circuit,
   wherein the second audio input signal is transmitted from the audio port to the input buffer set through the second pair of pins and the switching circuit and then inputted into the audio codec circuit.

5. The audio mixing device of claim 4, further comprising:
   a third pair of pins coupled to the audio port through a pair of resistors,
   wherein the audio codec circuit provides a bias voltage to two conducting wires disposed in the audio port and corresponding to the second pair of pins through the third pair of pins and the pair of resistors, and the second audio input signal is inputted into the audio codec circuit.

6. The audio mixing device of claim 1, wherein the audio codec circuit comprises a playing path and a recording path, the playing path is configured to output the audio output signal, and the recording path is configured to transmit the first audio input signal into the audio codec circuit.

7. The audio mixing device of claim 6, wherein the recording path comprises:
an analog-to-digital converter (ADC) circuit; and
a first filter circuit coupled to the ADC circuit,
wherein the first audio input signal is transmitted to a digital interface in the audio codec circuit through the ADC circuit and the first filter circuit.

8. The audio mixing device of claim 7, wherein the playing path comprises:
a digital-to-analog (DAC) circuit; and
a second filter circuit coupled to the DAC circuit,
wherein the audio output signal outputted from the digital interface is transmitted to the DC shifting buffer set through the second filter circuit and the DAC circuit.

9. The audio mixing device of claim 8, wherein the first filter circuit is a downsampling filter, and the second filter circuit is an oversampling filter.

10. An audio mixing method, comprising:
outputting, by an output buffer set in an audio mixing device, an audio output signal to a first pair of pins;
receiving, by a direct current (DC) shifting buffer set in the audio mixing device, a first audio input signal from an audio port through the first pair of pins, wherein the DC shifting buffer set is directly coupled to the output buffer set and the first pair of pins; and
recording, by an audio codec circuit in the audio mixing device, the audio output signal back via the DC shifting buffer set and mixing, by the audio codec circuit, the recorded audio output signal with a second audio input signal, or mixing the first audio input signal with a third audio input signal,
wherein a buffer of the DC shifting buffer set comprises:

an alternating current (AC) signal source;
a buffer circuit having a first input terminal, a second input terminal and an output terminal, wherein the output terminal is coupled to the first input terminal and the buffer circuit is configured to receive a DC voltage;
a first resistor coupled between the AC signal source and the second input terminal of the buffer circuit; and
a second resistor coupled to the second input terminal and configured to receive the DC voltage,
wherein the output terminal of the buffer circuit is directly coupled to the first input terminal of the buffer circuit.

11. The audio mixing method of claim 10, wherein the third audio input signal is transmitted from an external chip or an external electric device.

12. The audio mixing method of claim 10, further comprising:
providing a bias voltage to two conducting wires disposed in the audio port and corresponding to the first pair of pins, wherein the first audio input signal is transmitted from the audio port to the DC shifting buffer set through the first pair of pins and then inputted into the audio codec circuit.

13. The audio mixing method of claim 10, wherein the second audio input signal is transmitted from the audio port to an input buffer set through a second pair of pins and a switching circuit and then inputted into the audio codec circuit.

14. The audio mixing method of claim 13, further comprising:
providing a bias voltage to two conducting wires disposed in the audio port and corresponding to the second pair of pins through a third pair of pins and a pair of resistors, and the second audio input signal is inputted into the audio codec circuit.

15. The audio mixing method of claim 10, wherein the audio codec circuit comprises a playing path and a recording path, the playing path is configured to output the audio output signal, and the recording path is configured to transmit the first audio input signal into the audio codec circuit.

* * * * *